Patented Mar. 27, 1945

2,372,284

UNITED STATES PATENT OFFICE 2,372,284

COATED CEMENT PRODUCT AND THE MANUFACTURE THEREOF

Henri M. Marc, Cincinnati, Ohio, assignor to The Philip Carey Manufacturing Company, a corporation of Ohio No Drawing. Application September 24, 1941, Serial No. 412,109

23 Claims. (Cl. 117—126)

This invention relates to coated hydraulic cement products, and more particularly pertains to pigmented surface coating veneers applied to a base or slab of indurated Portland cement, said base preferably containing reinforcing fibers and fine granular aggregates or fillers. The coating may contrast in color with the base and preferably is sufficiently opaque to conceal the color of the base and to provide it with a decorative color finish that is highly weather-resistant. The invention is particularly adapted to the color veneering of cement-asbestos products, which are extensively used as roofing and siding materials for buildings, to afford desirable decorative effects and in addition protection from the weather.

In the manufacture of cement-asbestos roofing and siding materials (so-called rigid asbestos shingles, siding units, clapboards, slabs and corrugated roofing sheets) it has been the usual practice to provide color, where a color other than that of the natural gray of Portland cement is desired, in different ways. According to one method a stable mineral pigment is incorporated in the plastic cement-asbestos mixture before it is formed and pressed, thus providing an integral color throughout the indurated mass. This requires the use of very large amounts of expensive pigment, however, and results in excessively increasing the cost of the product, while at the same time the pigment, replacing Portland cement in the mixture, considerably reduces the strength of the product which also is a serious practical objection to this method.

A second method involves the application to the cement-asbestos base of a pigmented veneer containing mineral pigment, Portland cement, fine asbestos fiber, and also in some cases, fine mineral fillers. This veneer material may be applied either by dusting on the surface of the cement-asbestos base after it has been formed, but before it has taken its initial set, or flowing or brushing the mixture on the surface in the form of a water suspension or slurry of the materials. In either case, the veneer is applied while the cement-asbestos base is still in a semi-plastic condition and before it has set and hardened. The product, with the veneer layer adhered to the base, is then subjected to high pressure, usually from 2000 to 5000 pounds per square inch, to express a substantial amount of the free water retained in the formed mass and so as to compress and consolidate the cement-asbestos material and increase the strength of the indurated product. The compressed units are cut to the desired shape and size and are then subjected to curing by storage under suitable conditions to permit substantial completion of the hydration and induration of the Portland cement in the product.

It has been proposed, heretofore, to apply a solution of sodium silicate mixed with a pigment of desired color to the surface of a preformed cement product, and then heat the coating to about 900° to 1400° F., to insolubilize the sodium silicate, namely, to render the sodium silicate more insoluble and resistant to the action of water. This method has several disadvantages which present such difficulties that the method has not, so far as I am aware, gone into practical use. One of these disadvantages is that sodium silicate, when dried at a temperature that effects drying at sufficient rate to afford a practical operation, tends to intumesce with resultant formation of blisters, pinholes and pockmarks in the coating, with resultant poor adherence of the coating veneer to the underlying product and poor weather resistance. Another difficulty is that the material sodium silicate even when mixed with a pigment such as iron oxide, titanium oxide, etc., while it can be insolubilized somewhat by heat treatment, cannot be rendered sufficiently insoluble to be satisfactorily weather resistant by heat treatment at any temperature. The most serious difficulty, however, that is incident to the use of sodium silicate lies in the fact that in order to achieve any substantial insolubilization at all of sodium silicate it is necessary to heat the applied sodium silicate coating to a temperature of at least about 900° F. This, however, is very deleterious to any hydraulic cement product to which the coating is applied. Indurated Portland cement is deleteriously affected by heat due to driving off of water of constitution which water of constitution is essential to the structural integrity and strength of an indurated cement product. This deleterious action is pronounced at temperatures around 750° F. and produces, even for short applications of such temperature such as 2 or 3 minutes, adverse effects which are permanent and cannot be remedied by subsequent reabsorption of moisture. These adverse effects result in increased brittleness, loss of strength and lowering of modulus of rupture. At temperatures of about 800° F. or above the break down of indurated Portland cement becomes very pronounced. It may also be mentioned that the application of temperatures of 750° F. or over to indurated cement products frequently results in warping and dimensional difficulties. While attempts have been made to heat surface coated cement products at temperatures of 900° F. or more for only short periods of time, I have found it impossible to bring the temperature of the coating to a curing temperature of 900° F. without heating the indurated cement product, at least adjacent the coating, to such an extent that the product is seriously and permanently injured in the respects above mentioned.

One of the principal features of the present invention is predicated upon my discovery, as the result of extensive experimentation and research, that potassium silicate possesses veneer forming properties which are entirely different from the veneer forming properties of sodium silicate. While one might expect sodium and potassium silicates to be equivalents, I have found that this is not by any means the case.

The special properties of potassium silicate have to do primarily with its behaviour upon drying and upon curing at elevated temperatures when used as a coating for indurated cement products. The most important distinguishing characteristic of potassium silicate is its capacity to become insolubilized by curing at relatively low temperatures. Thus the optimum temperature for curing potassium silicate is approximately 500° F. whereas with sodium silicate a temperature of at least 900° F. is required and no substantial curing whatever is effected at 500° F. The fact that a potassium silicate coating can be insolubilized by curing at temperatures of around 500° F. is of very great commercial importance. It has been mentioned above that indurated Portland cement is irreparably damaged by heating to temperatures above about 750° F. and that for this reason curing temperatures of 900° F., which are necessary for sodium silicate, inevitably result in injury to the cement product. According to the present invention a potassium silicate coating may be applied to a cement product and cured at around 500° F., a temperature which is the optimum temperature for curing potassium silicate and which does not result in any injury to the cement product. Moreover, there is a very considerable saving in heat in maintaining oven conditions necessary to heat the coating to 500° F. as compared with oven conditions necessary to heat the coating to 900° F. or above. There is also saving of time since less time is required to heat the coating for a cement product to 500° F. than is required to heat the coating for a similar cement product to 900° F. or higher.

Another unpredictable advantage of potassium silicate as compared with sodium silicate as a coating for a cement product, is its ability to become much more insoluble than sodium silicate upon heat curing. When a coating consisting essentially of potassium silicate with or without a pigment to provide desired color is heat cured at about 500° F. for a few minutes, e. g. 10 to 15 minutes, the coating is rendered so insoluble that it will withstand immersion in boiling water for about two hours without substantially disintegrating or scaling off. However, when a similar sodium silicate coating is cured at the optimum temperature conditions, i. e., 900° F. to 1000° F., for 15 minutes or longer, the coating upon immersion in boiling water substantially completely comes off the cement product to which it is applied in about 5 minutes. Thus I have found that potassium silicate has the capacity to form films and coatings which are much more insoluble and weather resistant than similar coatings made with sodium silicate instead of potassium silicate.

Another special feature of potassium silicate is its capacity to be rapidly dried without harmful intumescence and blistering. As aforesaid, when aqueous sodium silicate is applied as a coating, attempt to accelerate drying by heating results in intumescence and blistering which render the coating substantially valueless. With potassium silicate, on the other hand, no special care has to be taken in drying an aqueous coating composition. Thus an aqueous coating containing potassium silicate may be placed, immediately after application to the surface of a cement product, in a drying oven maintained at a temperature of 200° F. to 250° F., thereby causing rapid drying of the coating, e. g., in about 10 to 15 minutes, without producing any harmful intumescence or blistering. This is of great importance commercially since any operation which requires prolonged drying at approximately atmospheric temperatures is excessively costly and is commercially impractical.

Another special attribute of potassium silicate coatings is the capacity of the coatings to adhere firmly to the surface of cement products. A potassium silicate coating tends to adhere very firmly to the surface and in effect becomes integral therewith, whereas a similar sodium silicate coating tends to be more loosely bonded to the surface and tends to scale off especially when subjected to boiling water.

Other features of this invention relate to the employment of clay, together with potassium silicate, in the coatings for cement products in order to afford improved resistance to hot water and to weathering. This feature of the present invention will be described more in detail hereinbelow.

This invention may be practiced in several different ways. In order to afford a better understanding of this invention and the ways in which it may be practiced specific examples will be referred to for purposes of illustration.

According to one method of practicing this invention potassium silicate per se is applied to the surface of a cement product, e. g., asbestos-cement shingle material. The potassium silicate may be applied in the form of solution whose specific gravity is approximately 29° Bé. wherein the molecular ratio of $K_2O$ to $SiO_2$ is about 1 to 3.7, by any desired method of application, e. g., spraying. The coating is preferably applied to the cement product after it has attained its initial hydraulic set or may be applied after it has attained its final set or even after it is substantially completely cured. The coating is applied in an amount such that when the film is dried and cured it will be about .0015 inch in thickness. Immediately after application of the potassium silicate to the cement product, the product is placed in a drying chamber maintained at a temperature of about 212° F. The coating can be sufficiently dried in about 15 minutes. The coating is thereafter cured by heating the same to about 500° F. for about 15 minutes. Preferably, however, the article is cured by exposing it to radiant heat which serves to heat the coating more rapidly without the necessity for heating the underlying body of the cement product so completely and thereby minimizes the curing time. Moreover, by use of radiant heat the coating can be heated more uniformly throughout the extent thereof than is possible by use of an ordinary type of drying oven. After the curing step, the product will be found to have an insoluble glaze-like coating or veneer of heat-cured potassium silicate adherent thereto. The coating will not show any substantially deleterious effects even when the product is boiled in water for about two hours. As aforesaid, a sodium silicate coating similarly formulated, applied and cured, exhibits no substantial resistance whatever to boiling water, and this is also the case if such a sodium silicate coating is heat-cured at much higher temperatures, e. g., around 900° to 1000° C. Moreover, the sodium silicate blisters badly during drying, but even when dried at atmospheric temperatures to avoid blistering, it is impossible to achieve any substantial resistance to boiling water.

The coating of the foregoing example is substantially colorless and transparent and, while useful for many purposes in this form, e. g., as a superficial protective coating for asbestos-cement products, it is more generally desired to incorporate a heat-resistant inorganic pigment in the coating such as titanium oxide (white), iron oxides (red, brown or black), chromic oxide (green), ultramarine blue, or the like. By "heat-resistant," it is meant that the pigment is sufficiently stable under the curing temperature to resist deleterious disintegration or loss of desired color. Thus, for example, for every five parts by dry weight of potassium silicate, one part of pigment may be employed. This will give a coating of desired color and of sufficient opacity to obscure the color of the underlying cement product. When a pigment is used, the thickness of the dried and cured film may be, for example, about .002 to .005 inch. If desired, an extender may be employed such as very finely-divided calcium carbonate or natural calcium carbonate that has been very finely ground. Precipitated magnesium silicate, such as that sold under the trade-name Silene, may also be used as well as other finely-divided heat-resistant inorganic fillers such as pulverized silica, fibrous talc ("Asbestine"), etc. If desired, the amount of pigment or other filler may be increased. Thus, for example, of the dry weight of solids in the coating, about fifty per cent. may be filler (pigment, extender or the like) and fifty per cent. may be potassium silicate. It is usually not desirable, however, to reduce the amount of potassium silicate to less than about thirty per cent. by dry weight of the solids in the coating.

In the curing of potassium silicate coatings of the character aforesaid, 500° F. has been found to be the best curing temperature as far as insolubility of the heat-cured coating is concerned. At lower curing temperatures, on the one hand, and at higher curing temperatures on the other hand, the insolubility of the coating is not as great. A preferred temperautre range is about 425° F. to about 550° F., although quite good results may also be attained at temperatures between about 350° F. and about 600° F. It is apparent, therefore, that optimum conditions for curing the potassium silicate coating are well under the temperature at which indurated cement products are permanently harmed, i. e., about 750° F., and that the advantages of this invention's use may be attained by curing potassium silicate coatings at temperatures substantially lower than 750° F. Preferably, the curing temperature is kept below 700° F.

In the practice of this invention, certain special advantages result from the employment of clay as a filler in the potassium silicate veneer coatings. Clays are insoluble metallic silicates, most of them being essentially aluminum silicates. There are certain clays such as bentonite (containing predominantly the mineral montmorillonite) which have a higher proportion of silica and less water in their constitution than the usual kaolin clay. The addition of clay to the coating has the effect of rendering a heat-cured coating containing it, together with potassium silicate somewhat more completely insoluble than when clay is omitted. Some clays such as bentonite tend to absorb water and swell, and such clays are less desirable, although they can be used when mixed with the coating composition if the coating composition is mixed and applied very promptly before the clay tends to swell and, by absorption of water, prematurely precipitate the silica in the composition. Of the clays, the kaolinitic type clays, namely, aluminum disilicates of the general formula $Al_2O_3 2SiO_2 xH_2O$ are distinctly preferable. These clays are obtainable of relatively high purity and are of a physical structure that appears to be especially beneficial and effective in the coating.

When clay is used in the potassium silicate coating composition, the clay not only gives more body to the inorganic veneer coating but also appears to give it somewhat better weather resistance, the effect of kaolinitic type clays being especially effective in this regard. The benefits that result from the employment of clay become more pronounced up to about 25% by dry weight of the total dry weight of potassium silicate and clay, while greater amounts do not materially increase the weather resistance of the coating. When it is desired to give the film considerable body and it is desired to extend the potassium silicate, the potassium silicate and clay may be employed, with the clay in amounts up to about fifty per cent. by dry weight of the solids in the composition, and it is ordinarily preferable not to use a greater proportion of clay. As aforesaid, however, even as low as thirty per cent. of potassium silicate by dry weight of solids in the coating as a whole will afford advantages according to this invention. The balance may be clay or clay mixed with pigment or other filler. On the other hand, as little as five per cent. of clay by dry weight of solids in the composition is effective in improving the coating and preferably over ten per cent. of the composition is clay. Usually, for clay-containing coating, the composition is about twenty per cent. to about forty per cent. of clay by dry weight of solids in the composition.

A typical desirable coating composition containing clay is as follows (the parts being by dry weight):

| | Parts |
|---|---|
| Potassium silicate | 30 |
| Kaolinitic type clay | 12 |

If desired, color can be imparted by a pigment, a typical example being (the parts being by dry weight):

| | Parts |
|---|---|
| Potassium silicate | 30 |
| Clay | 10 |
| Pigment | 10 |

In each of the foreging examples wherein clay or clay and pigment is used, an aqueous composition containing about forty to fifty per cent. of solids (including potassium silicate) has been found to apply quite readily to a cement product, e. g., by spraying. The coating may be applied in an amount such that when cured it will be about .002 to .005 inch in thickness. The coatings can be dried and cured at the temperatures and under the conditions mentioned in the preceding example. Here again, the optimum heat-curing conditions are afforded by heat-curing at temperatures of about 500° F. When clay is used, the adverse effects of curing at higher temperatures than 500° F. are somewhat less, however.

In the practice of this invention, the use of metal compounds that react with the potassium silicate to form insoluble metal silicates is avoided, except when such compounds are present in small quantities. A compound such as zinc oxide, for example, will react with potassium silicate to form zinc silicate. But I have found that when a material such as zinc oxide is employed in relatively considerable quantities in proportion to the potassium silicate, there is a precipitating action that prevents proper application and curing of the composition on the surface of a cement product. Other oxides, such as the oxides of magnesium, calcium, barium, strontium, and cadmium, behave very similarly. If such oxides are prepared in a special way so as to be substantially non-reactive and inert as by calcination at extremely high temperatures then they merely constitute diluent fillers and may be used, but in their ordinary reactive form they are preferably omitted and should not be present except in small amounts.

In the description of this invention and in the claims when reference is made to heat curing potassium silicate or to insoluble heat-cured potassium silicate, it is not intended to refer to reaction products produced by reacting potassium silicate with a non-alkali metal oxide to convert the silicate into a non-alkali metal insoluble silicate, for in such case neither the material being cured nor the cured product is potassium silicate. When potassium silicate is cured in admixture with clay, a different situation is presented. In such case, the clay is a non-alkali metal insoluble silicate of stable form. During curing in the presence of clay, it is a matter of conjecture whether or not the clay and potassium silicate remain in simple admixture or tend to form additively in whole or in part a more complex silicate. In either of the latter events, however, for the purpose of describing and claiming this invention, the original potassium silicate, since it is not converted to some non-alkali metal insoluble silicate, is regarded as remaining in the composition as potassium silicate, both during the curing step and in the cured product. As aforesaid, it is desirable that the amount of potassium silicate that is insolubilized during the curing step be at least about thirty per cent. by dry weight of the solids in the composition.

While it is preferable that all of the soluble silicate be in the form of potassium silicate, it is not essential in achieving some of the advantages of this invention that the soluble silicate in the coating consist entirely of potassium silicate inasmuch as there is some tolerance as far as other soluble silicates are concerned. Thus the presence of sodium silicate may be tolerated in small amounts, but its presence even in small amounts is somewhat disadvantageous. Preferably at least about 75% by weight of the soluble silicate is potassium silicate, or, in other words, if sodium silicate is present with the potassium silicate, it is preferable that less than 25% of the soluble silicate be sodium silicate. In any event, a major proportion of the soluble silicate should be potassium silicate, inasmuch as, if the proportion of potassium silicate in the coating composition is further reduced in relation to other soluble silicates, the advantages of this invention are largely lost.

When sodium silicate is present in addition to potassium silicate, the curing temperature may advantageously be somewhat higher. Thus, for example, when the soluble silicate consists of 75% to 100% of potassium silicate and 25% to 0% sodium silicate, it is preferred to cure at temperatures between 425° F. and 700° F. At such concentrations of sodium silicate, the presence of the sodium silicate does not interfere substantially with drying the coating at temperatures above about 200° F. prior to heat curing it. When the concentration of sodium silicate is between about 25% and about 50% of the soluble silicate, the balance being potassium silicate, the curing temperature is ordinarily about 550° F. to 750° F. and is preferably about 600° F. to 700° F. Moreover, when the sodium silicate is increased to this extent, the drying of the coating prior to curing should be conducted at a somewhat lower temperature, namely, not above about 210° F. It may be pointed out, however, that optimum curing conditions are well below the temperature at which the cement product is deleteriously affected by heat, namely, below 750° F. and preferably below 700° F.

When the coating composition contains more than about 25% of filler by dry weight of the solids in the composition, somewhat higher gloss can be obtained by using a mixture of sodium and potassium silicate wherein the sodium silicate constitutes about 25% to about 50% of the total soluble silicate.

As an example of a coating composition containing a mixture of potassium silicate and sodium silicate, the following may be cited as typical (the amounts being by dry weight):

| | Parts |
|---|---|
| Potassium silicate | 21 |
| Sodium silicate | 7 |
| Kaolinitic type clay | 15 |
| Pigment | 15 |

It is to be noted that in the foregoing example 15 parts of kaolinitic type clay are included. As is the case with potassium silicate alone, the presence of the clay promotes the formation by heat curing of a coating or veneer that is of decreased solubility. While the clay could be omitted from the foregoing example, the coating without the clay, while generally satisfactory from the point of view of weather resistance, is improved in this regard by the presence of the clay. The clay has the effect of somewhat offsetting the disadvantage that results from the presence of the sodium silicate in the coating composition. The presence of the clay is therefore regarded as being particularly beneficial when the soluble silicate consists of a minor proportion of sodium silicate in addition to the potassium silicate. When sodium silicate is present in the composition in minor amount, preferably at least about 10% by weight of clay is also used in the composition. About 20% to about 40% of clay by dry weight of the solids in the composition is good practice under such conditions.

The potassium silicate that is used preferably has a molecular ratio of $K_2O$ to $SiO_2$ between about 1 to 3.7 and about 1 to 4.0. When the $SiO_2$ content is greater than a ratio corresponding to 1 to 4.2, then there is excessive tendency to premature precipitation and gelation which prevents satisfactory application of the silicate to a cement product. On the other extreme, the amount of SiO₂ should not be less than a ratio corresponding to 1 to 3.0, inasmuch as lesser proportions of SiO₂ tend to prevent the formation of cured coatings which have a high degree of insolubility. Usually it is desirable to work with potassium silicate solutions of about 27 to 30° Bé. If attempt is made to increase the concentration much above this, then there may be a tendency to permature precipitation and gelation. When a filler is used in conjunction with the potassium silicate, it is usually desirable to dilute a solution of 27 to 30° Bé. somewhat so as to facilitate application. Generally, one can readily apply the composition when the per cent. solids by dry weight in the aqueous composition (including the soluble silicate) is about 40 to 50% of the aqueous composition as applied. The composition may be applied at greater dilutions but this requires evaporation of more water and is ordinarily not done except when extremely thin coatings are desired. Dilutions such that the solids (including soluble silicate) are below about 10% are not desirable, however. Preferably the composition is applied so that the dried and cured coating will be about .002 to .005 inch in thickness, about .003 inch being good practice. When, however, potassium silicate is used by itself or with a relatively small proportion of pigment or other filler, the coating may be considerably less than .002 inch in thickness and still provide a substantially continuous weatherproof and durable veneer. Such thin glaze-like veneers are attained when maintaining the amount of soluble silicate about 75% by weight of dry solids in the coating composition. The application of the soluble silicate to the cement product may be by spraying, brushing, dipping or any other suitable method.

When some sodium silicate is added to the potassium silicate, the sodium silicate that is used preferably has a molecular ratio of Na₂O to SiO₂ between about 1 to 3 and about 1 to 4. Or considering the soluble silicate as a whole in the mixture, the ratio of alkaline oxide to SiO₂ is desirably between about 1 to 3 and about 1 to 4 and is preferably between about 1 to 3.5 and 1 to 4.

The precise action which takes place when potassium silicate is subjected to heat curing is not definitely understood, although it is believed that during drying, the silica therein is precipitated as a gel and that during subsequent heating the precipitated gel is rendered irreversible so that it cannot again be dispersed in water. Moreover, as aforesaid, when potassium silicate is cured while in the presence of clay, there may or may not be formed more complex potassium silicates. For this reason, it is believed that the novel product of this invention is best defined as an indurated cement product which is surface-coated with a hardened inorganic coating, which coating is the product of drying and heat curing an aqueous composition containing soluble silicate consisting predominantly of potassium silicate.

The new product of this invention is further characterized by its extreme insolubility. One way of determining the insolubility of the coating is to obtain a sample of a cement product that has a 2½ x 2½ inch surface area coated with the silicate coating so that the coating for this area has a known weight, e. g., conveniently substantially 0.2 gram (dry weight), coat the balance of the article with a phenolaldehyde resin that is substantially impervious to and unaffected by boiling water for about five minutes, place the prepared specimen in the boiling distilled water for five minutes, and then titrate the alkali loss with .01 NHCl. Using this test, comparative results may be obtained and, as aforesaid for potassium silicate coating, maximum insolubility is obtained by curing at about 500° F. At other curing temperatures, less favorable results are obtainable, although very desirable results are obtainable within the curing temperatures above mentioned. The curing temperature of potassium silicate coating is therefore evidenced in the cured coatings, and cement products surface-coated with coatings containing potassium silicate that have been cured at the temperatures hereinabove set forth are new and improved products in the art. As aforesaid, a cement product coated with sodium silicate either by itself or mixed with pigment such as iron oxide, titanium oxide or the like, while somewhat resistant to cold water, is substantially completely disintegrated by five minutes exposure to boiling water, whereas the potassium silicate coatings herein described and claimed are only very slightly affected under the test conditions by exposure by boiling water for five minutes.

The above-described test enables one to determine the amount of alkali dissolved from the cured coating on the test area during the period of the test. The amount of alkali in the coating initially applied to test area is, of course, also known, since the amount of soluble silicate used and the composition of the soluble silicate are known. The insolubilization of the soluble silicate as a result of curing is represented by the following "index of solubility" of the cured coating:

$$\frac{\text{Amount of alkali dissolved from cured coating}}{\text{Total alkali in coating as applied}} \times 100$$

If all of the alkali were to be dissolved from the cured coating, the index of solubility would be 100. With a coating consisting essentially of potassium silicate cured on a cement product at about 500° F., an index of solubility as low as 18 is obtainable according to this invention. If the coating contains 80% potassium silicate (dry weight) and 20% of red ferric oxide, for example, the index of solubility of the cured coating is slightly lower. In contrast, a coating consisting essentially of sodium silicate (or containing 20% of red ferric oxide) that is cured at 900° F. has an index of solubility that is much higher, namely, about 85 to 90, thus indicating that nearly all of the alkali is dissolved during the test, and this explains the substantially complete disintegration of such cured sodium silicate coatings during the test and the relatively poor weather resistance of such coatings as compared with coatings made according to this invention. If such a sodium silicate coating is cured at 500° F., the index of solubility is over 90. When a coating is formulated with clay, e. g., 75% potassium silicate (dry weight) and 25% kaolin clay and cured at about 500° F., the index of solubility is very low, namely, around 2 or 3. Somewhat more generally for cement products that are to be exposed to the weather, e. g., asbestos-cement shingles and sidings, it is desirable that the index of solubility be below about 20, although it is preferable that the index of solubility be below about 10. For cement products designed for interior work, e. g., wallboard, tiles, etc., the index of solubility may be somewhat higher, i. e., it is desirable that the index of solubility be below about 35 and preferably below about 20.

Another and somewhat simpler test for determining the insolubility of the surface coating for indurated cement products consists in immersing the product, or a portion thereof that carries the coating, in boiling water for a quite prolonged period of time. Thus I have tested cement products produced according to my invention by subjecting them to boiling water. If the hardened coating does not become chalky or does not eexhibit poor adhesion to the cement body, the coating is regarded as resistant to boiling water for the test period. When the coating becomes chalky, this is evidenced by the chalklike material that can be rubbed from the surface of the coating by the finger. If the specimen after boiling is not subject to chalking upon being rubbed with the finger, the coating is regarded as having satisfactory resistance to chalking under the conditions of the test. Poor adhesion is evidenced by tendency to scale off upon mechanical abrasion. If the coating remains firmly bonded after being subjected to boiling water, it is regarded as being satisfactory in this regard under the conditions of the test. Boiling a surface-coated cement product for as long as 24 hours is a very severe test, and, if the material will stand up under this test, the coating will be extremely weather-resistant. This very high resistance to boiling water can readily be attained according to preferred embodiments of this invention. Especially high resistance to boiling water is attainable when the coating contains clay (preferably kaolinitic type clay) and such coatings are especially recommended for exterior use, e. g., on asbestos cement shingles, siding material, corrugated sheathing, etc. When the clay is omitted, e. g., when the coating contains soluble silicate (predominantly potassium silicate) per se, or with some pigment such as titanium oxide, iron oxide or the like, coatings have been prepared under optimum conditions according to this invention which are resistant to boiling water for as long as 24 hours. However, coatings which are resistant to boiling water for two hours have good weather resistance when used for exterior work and are more than ample in water resistance for interior use and any cement products surface-coated with such a coating constitute a distinct improvement in the art.

During the drying step that is incident to the production of the hardened coating, the bulk of the water that is contained in the aqueous composition that is applied to the cement product is removed and the coating forms a gel and takes an initial set which places the coating in proper condition for curing. This can be carried out suitably at a temperature of about 200° to 250° F. in the case of the coatings wherein the soluble silicate contains about 75% or more by weight of potassium silicate, and preferably is carried out at a temperature above 212° F. since the drying time is thereby considerably lessened. When the soluble silicate contains about 25% to 50% of sodium silicate, the drying step is preferably carried out at a temperature of about 175° F. to about 210° F. Ordinarily, the drying and the curing are carried out as separate operations but this is not essential inasmuch as the coated cement product may be progressively taken through the drying temperature into the temperature of curing, as by passing the product through an oven wherein it is subjected to progressively increasing temperature. Moreover, even the placing of a coated cement product in an oven wherein the coating is initially subjected to the curing temperature is to be regarded as involving a drying and curing operation inasmuch as the coating even under such conditions is first dried (very rapidly) and then cured. It is not essential that all of the water be expelled during the drying step inasmuch as after the coating composition has become initially set during drying, residual water may be expelled during the curing step. The drying time will, of course, vary depending upon the proportion of water in the applied aqueous composition, the thickness of the composition applied, the character of the atmosphere in the drying chamber, the drying temperature, etc. Usually about 10 to 20 minutes is sufficient. Drying at atmospheric temperature is possible but requires an excessively long time.

The time required for the curing step is relatively short. All that is required is to bring the coating up to curing temperature for a few minutes. Usually 10 to 20 minutes of curing is sufficient, but longer curing periods up to about one hour improve the insolubility of the cured coating to a slight extent.

In general, this invention may be practiced in combination with indurated cement products of all kinds. The cement product may contain hydraulic cement such as Portland cement per se or in admixture with other materials as in concrete, asbestos-cement products, etc. Typical cement products that may be manufactured with a hardened inorganic coating according to this invention are shingles, siding units, corrugated sheathing, preformed masonry products, tiles, bricks, etc.

While this invention has been described in connection with certain examples and illustrative embodiments thereof, it is to be understood that this has been done for illustrative purposes only and that such examples and embodiments may be varied without departing from the scope of this invention which is to be determined by the language of the following claims.

I claim:

1. A method of coating an hydraulic cement product which comprises applying to the product as a coating an aqueous composition that contains soluble silicate consisting predominantly of potassium silicate, and drying and heat curing the coating, said heat curing of said coating including soluble silicate contained therein being carried out at a temperature below about 600° F. and above about 350° F. to insolubilize said soluble silicate by said heat curing to a solubility index below 35.

2. A method according to claim 1 wherein the curing temperature is in the neighborhood of 500° F.

3. A method according to claim 1 wherein the amount of soluble silicate that is insolubilized during the heat-curing step is at least about 30% by dry weight of the solids in the coating.

4. A method of coating an hydraulic cement product which comprises applying to the product as a coating an aqueous composition in fluid form that contains soluble silicate at least about 75% of which is potassium silicate, and drying and heat curing the coating, said heat curing of said coating including the soluble silicate contained therein being carried out for a period of at least 10 minutes at a temperature above about 425° F. and not above about 600° F. to insolubilize said soluble silicate by said heat curing to a solubility index not greater than 20, the amount of soluble silicate in the coating that is insolubilized during the heat curing step being at least about 50% by dry weight of the solids in the coating.

5. A method of coating a hydraulic cement product which comprises applying to the product as a coating an aqueous composition that contains soluble silicate, said soluble silicate containing at least about 50% of potassium silicate, drying the coating at a temperature above about 175° F. without substantial intumescence, and heat curing said coating including said soluble silicate contained therein at a temperature above about 350° F. and not above about 600° F. to insolubilize said soluble silicate by said heat curing to a solubility index below 35, the amount of soluble silicate in the coating that is insolubilized during the heat curing step being at least about 30% by dry weight of the solids in the coating.

6. A method of coating an hydraulic cement product which comprises applying to said product as a coating an aqueous composition that contains soluble silicate, said soluble silicate containing at least about 75% of potassium silicate, drying the coating at a temperature above about 212° F., and heat curing said coating including said soluble silicate contained therein for at least 10 minutes at a temperature above about 350° F. and not above about 600° F. to insolubilize said soluble silicate by said heat curing until said coating is resistant to boiling water for at least two hours, the amount of soluble silicate in the coating that is insolubilized during the heat curing step being at least about 30% by dry weight of the solids in the coating.

7. A method of coating an hydraulic cement product which comprises applying to said product as a coating an aqueous composition that contains soluble silicate consisting essentially of potassium silicate, and drying and heat curing the coating said heat curing of said coating including said soluble silicate contained therein being carried out at a temperature above about 350° F. and not above about 600° F. to insolubilize said potassium silicate by said heat curing to a solubility index below 35, the amount of soluble silicate in the coating that is insolubilized during the heat curing step being at least about 30% by dry weight of the solids in the coating.

8. A method of coating an hydraulic cement product which comprises applying to said product as a coating an aqueous composition that contains at least about 50% (by weight of dry solids) of soluble silicate consisting essentially of potassium silicate, drying the coating at a temperature between about 200° F. and about 250° F. and heat curing the coating including said potassium silicate for at least 10 minutes at a temperature above about 425° F. and not above about 550° F. to insolubilize said potassium silicate by said heat curing to a solubility index not greater than 20.

9. A method of coating a cement product which comprises applying to said product as a coating an aqueous composition that contains soluble silicate, said soluble silicate consisting predominantly of potassium silicate, and that contains clay dispersed therein, and drying and heat curing the coating said heat curing of the coating including soluble silicate contained therein being carried out at a temperature above about 350° F. and not above about 600° F. to insolubilize said soluble silicate by said heat curing to a solubility index less than 35.

10. A method of coating a cement product which comprises applying to said product as a coating an aqueous composition that contains soluble silicate, said soluble silicate containing at least 75% of potassium silicate, and that contains about 5% to about 50% (by dry weight of solids in the composition) of kaolinitic type clay, and drying and heat curing the coating, said heat curing of the coating including soluble silicate contained therein being carried out for at least 10 minutes at a temperature above about 350° F. and not above about 600° F. to insolubilize said soluble silicate by said heat curing to a solubility index not greater than 20, the amount of soluble silicate that is insolubilized during the heat curing step being at least about 30% by dry weight of the solids in the coating.

11. A method of coating a cement product which comprises applying to said product as a coating an aqueous composition that contains soluble silicate, said soluble silicate consisting of a mixture of potassium silicate and sodium silicate in which mixture the potassium silicate is at least about 50%, and that contains clay, and drying and heat curing the coating, said heat curing of the coating including soluble silicate contained therein being carried out at a temperature above about 350° F. and not above about 600° F. to insolubilize said soluble silicate by said heat curing to a solubility index not greater than about 10, the amount of soluble silicate that is insolubilized during the heat curing step being at least about 30% by dry weight of the solids in the coating.

12. A method of coating a cement product which comprises applying to said product as a coating an aqueous composition that contains at least about 50% (by dry weight of solids in the composition) of soluble silicate, said soluble silicate consisting of a mixture of potassium silicate and sodium silicate in which mixture the potassium silicate is at least about 75% by weight, and that contains kaolinitic type clay, drying the coating at a temperature between about 200° F. and about 250° F. and heat curing said coating including said soluble silicate for a period of at least 10 minutes at a temperature above about 350° F. and not above about 600° F. to insolubilize said soluble silicate by said heat curing until said coating is resistant to boiling water for at least 2 hours.

13. An indurated cement product surface-coated with a hardened inorganic coating, said hardened coating being the product of drying and of heat curing at a temperature above about 350° F. and not above about 600° F. an aqueous coating composition containing soluble silicate consisting predominantly of potassium silicate to insolubilize said soluble silicate and harden said coating by said heat curing until said coating is resistant to boiling water for at least about two hours.

14. An indurated cement product surface-coated with a hardened inorganic coating, said coating being the product of drying and heat curing an aqueous coating composition containing soluble silicate consisting predominantly of potassium silicate to insolubilize said soluble silicate and harden said coating, and said insolubilized soluble silicate being at least about 30% by dry weight of the solids in the coating and being the product of heat curing same in said coating at a temperature above about 350° F. and not above about 600° F. to impart to said coating an index of solubility less than about 35.

15. An indurated cement product surface-coated with a hardened inorganic coating, said coating being the product of drying and heat curing an aqueous coating composition containing soluble silicate at least 75% of which is potassium silicate to insolubilize said soluble silicate and harden said coating, and said insolubilized soluble silicate being the product of heat curing same in said coating at a temperature above about 350° F. and not above about 550° F. to a solubility index not greater than 20 and being at least about 50% by dry weight of the solids in the coating.

16. An indurated cement product surface-coated with a hardened inorganic coating, said coating being the product of drying and of heat curing at a temperature above about 350° F. and not above about 600° F. an aqueous coating composition containing soluble silicate consisting predominantly of potassium silicate and containing a substantial amount of clay, said soluble silicate being insolubilized by said heat curing to a solubility index not greater than about 10.

17. An indurated cement product surface-coated with a hardened inorganic coating, said coating being the product of drying and of heat curing at a temperature above about 350° F. and not above about 600° F. an aqueous coating composition that contains soluble silicate consisting predominantly of potassium silicate and that contains at least about 20% (by dry weight of solids in the composition) of clay, to insolubilize said soluble silicate and harden said coating by said heat curing until said heat cured coating is resistant to boiling water for at least about 24 hours.

18. An indurated cement product surface-coated with a hardened inorganic coating, said coating being the product of drying and heat curing an aqueous coating composition containing soluble silicate of which at least about 75% is potassium silicate and containing at least about 20% of kaolinitic type clay, to insolubilize said soluble silicate and harden said coating, said insolubilized soluble silicate being at least about 30% by dry weight of the coating and being the product of heat curing same in said coating at a temperature above about 350° F. and not above about 600° F. to impart to said coating an index of solubility less than about 20.

19. An indurated cement product surface-coated with a hardened inorganic coating, said inorganic coating being the product of drying and heat curing an aqueous coating composition containing soluble silicate consisting essentially of potassium silicate to insolubilize said soluble silicate and harden said coating, and said insolubilized soluble silicate being at least about 30% by dry weight of the coating and being the product of heat curing same in said coating at a temperature above about 350° F. and not above about 600° F. to impart to said coating an index of solubility less than about 35.

20. An indurated cement product surface-coated with a hardened inorganic coating, said coating being the product of drying and heat curing an aqueous coating composition consisting essentially of potassium silicate, to insolubilize said potassium silicate and harden said coating, said insolubilized potassium silicate being the product of heat curing same in said coating at a temperature above about 350° F. and not above about 550° F. to impart to said coating a solubility index less than about 35.

21. An indurated cement product surface-coated with a hardened inorganic coating, said coating being the product of drying and heat curing an aqueous coating composition containing soluble silicate consisting predominantly of potassium silicate to insolubilize said soluble silicate and harden said coating, said insolubilized soluble silicate being at least about 75% by dry weight of the coating and being the product of heat curing same in said coating at a temperature above about 350° F. and not above about 600° F. to impart to said coating a solubility index less than about 20.

22. An indurated cement product surface-coated with a hardened inorganic coating, said coating being the product of drying and heat curing an aqueous coating composition containing soluble silicate consisting essentially of a mixture of potassium silicate and sodium silicate, the potassium silicate being at least 75% by weight of said soluble silicate, to insolubilize said soluble silicate and harden said coating, said insolubilized mixed silicates being at least about 30% by dry weight of the coating and being the product of heat curing same in said coating at a temperature above about 350° F. and not above about 600° F. to impart to said coating a solubility index less than about 35.

23. An asbestos-cement shingle surface-coated with a hardened inorganic coating, said hardened coating being the product of drying and heat curing an aqueous coating composition containing soluble silicate at least about 75% of which is potassium silicate to insolubilize said soluble silicate and harden said coating, and said insolubilized soluble silicate being at least about 30% by weight of the solids in said coating and being the product of heat curing same in said coating at a temperature above about 350° F. and not above about 600° F. to impart to said coating an index of solubility less than about 35.

HENRI M. MARC.